United States Patent
Okawa et al.

(10) Patent No.: US 6,656,635 B2
(45) Date of Patent: Dec. 2, 2003

(54) NON-AQUEOUS ELECTROLYTE SECONDARY CELL

(75) Inventors: Tsuyoshi Okawa, Fukushima (JP); Mamoru Hosoya, Kanagawa (JP); Junji Kuyama, Kanagawa (JP); Yuzuru Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 103 days.

(21) Appl. No.: 09/972,395

(22) Filed: Oct. 5, 2001

(65) Prior Publication Data

US 2002/0106564 A1 Aug. 8, 2002

(30) Foreign Application Priority Data

Oct. 6, 2000 (JP) ........................................ 2000-308301

(51) Int. Cl.$^7$ ................................................ H01M 4/36
(52) U.S. Cl. .................... 429/221; 429/231.1; 429/223; 429/224; 429/220; 429/231.5; 429/231.6; 429/231.95; 429/94; 429/304
(58) Field of Search .............................. 429/231.1, 221, 429/223, 220, 224, 231.5, 231.6, 231.95, 94, 304

(56) References Cited

U.S. PATENT DOCUMENTS 6,280,882 B1 * 8/2001 Vallee et al. ................ 429/303
2002/0059719 A1 * 5/2002 Hosoya et al. .............. 429/221

* cited by examiner

*Primary Examiner*—Laura Weiner
(74) *Attorney, Agent, or Firm*—Sonnenschein, Nath & Rosenthal LLP (57) ABSTRACT

A non-aqueous electrolyte secondary cell containing a compound of an olivinic structure as a cathode active material is to be improved in load characteristics and cell capacity. To this end, there is provided a non-aqueous electrolyte secondary cell including a cathode having a layer of a cathode active material containing a compound represented by the general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, an anode having a layer of a cathode active material containing the anode active material and a non-aqueous electrolyte, wherein the layer of the cathode active material has a film thickness in a range from 25 to 110 $\mu$m. If a layer of a cathode active material is provided on each surface of a cathode current collector, the sum of the film thicknesses of the layers of the cathode active material ranges between 50 and 220 $\mu$m. The non-aqueous electrolyte may be a liquid-based electrolyte or a polymer electrolyte.

12 Claims, 1 Drawing Sheet

FIG.1

NON-AQUEOUS ELECTROLYTE SECONDARY CELL

RELATED APPLICATION DATA

The present application claims priority to Japanese Application(s) No(s). P2000-308301 filed Oct. 6, 2000, which application(s) is/are incorporated herein by reference to the extent permitted by law.

BACKGROUND OF THE INVENTION

1. Field of the Invention

This invention relates to a non-aqueous electrolyte secondary cell employing a so-called olivinic lithium phosphorus oxide as a cathode active material.

2. Description of Related Art

Nowadays, in keeping up with the recent marked progress in the electronic equipment, researches into re-chargeable secondary cells, as power sources usable conveniently and economically for prolonged time, are underway. Representative of the secondary cells are lead accumulators, alkali accumulators and non-aqueous electrolyte secondary cells.

Of the above secondary cells, lithium ion secondary cells, as non-aqueous electrolyte secondary cells, have such merits as high output and high energy density.

The lithium ion secondary cells are made up of a cathode and an anode, including active materials capable of reversibly doping/undoping lithium ions, and a non-aqueous electrolyte. The charging reaction of the lithium ion secondary cell proceeds as lithium ions are deintercalated into an electrolyte solution at the cathode and are intercalated into the anode active material. In discharging, reaction opposite to that of the charging reaction proceeds, such that lithium ions are interecalated at the cathode. That is, charging/discharging is repeated as the reaction of entrance/exiting of lithium ions from the cathode into the anode active material and from the anode active material occurs repeatedly.

As the cathode active material of the lithium ion secondary cell, $LiCoO_2$, $LiNiO_2$ or $LiMn_2O_4$ is used because these materials have a high energy density and a high voltage. However, these cathode active materials, containing metal-elements of low Clark number in their composition, suffer from high cost and supply instability. Moreover, these cathode active materials are higher in toxicity and affect the environment significantly. So, there is presented a demand for a novel substitution material usable as a cathode active material.

Proposals have been made for use of $LiFePO_4$, having an olivinic structure, as a cathode active material for a lithium ion secondary cell. $LiFePO_4$ has a volumetric density as high as 3.6 g/cm$^3$ and generates a high potential of 3.4V, with its theoretical capacity also being as high as 170 mAh/g. Additionally, $LiFePO_4$ contains an electrochemically undopable Li at a rate of one atom per Fe atom, in its initial state, and hence is promising as a cathode active material for a lithium ion secondary cell. Moreover, $LiFePO_4$ includes iron, as an inexpensive material plentiful in supply, in its composition, and hence is less costly than any of the aforementioned materials, that is $LiCoO_2$, $LiNiO_2$ or $LiMn_2O_4$. Additionally, $LiFePO_4$ is low in toxicity and hence is less aggressive to environment.

Although the olivinic lithium phosphorus oxides have the advantages as described above, there are difficulties that need to be surmounted if it is attempted to use the material for a cell.

For example, the oliviniic lithium phosphorus oxide is only poor in electronic conductivity, so that, if it is used as cathode active material, it is difficult to realize sufficient load characteristics.

For improving the load characteristics, it may be envisaged to reduce the thickness of the layer of the cathode active material. However, in this case, the proportion of the collector is relatively increased, so that the problem of the lowering of the capacity is raised.

SUMMARY OF THE INVENTION

It is therefore an object of the present invention to provide a non-aqueous electrolyte secondary cell in which, when a compound having an olivinic structure is used as a cathode active material, the load characteristics and the cell capacity can be compromised relative to each other to realize a non-aqueous electrolyte secondary cell having superior cell characteristics.

The present invention provides a non-aqueous electrolyte secondary cell including a cathode having a layer of a cathode active material containing a compound represented by the general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, an anode having a layer of a cathode active material containing an anode active material, and a non-aqueous electrolyte, wherein the layer of the cathode active material has a film thickness in a range from 25 to 110 μm.

Since the olivinic lithium phosphorus oxide is poor in electronic conductivity, it is difficult to realize sufficient load characteristics with the use of this oxide as a cathode active material. If load characteristics are taken into consideration, it is meritorious to reduce the film thickness of the layer of the cathode active material.

However, if the layer of the cathode active material is too thick, the proportion of the current collector in the inner cell capacity is relatively increased to lower the cell capacity.

In this perspective, the film thickness of the layer of the cathode active material is set to 25 to 110 μm.

With the thickness of the layer of the cathode active material in the above range, practically sufficient load characteristics can be achieved, whilst the cell capacity may be of a practically satisfactory level.

In the non-aqueous electrolyte secondary cell of the present invention, in which an olivinic lithium phosphorus oxide is used as a cathode active material, and the thickness of the layer of the cathode active material is optimized, the load characteristics can be compromised relative to the cell capacity to realize a non-aqueous electrolyte secondary cell having superior cell performance.

DESCRIPTION OF THE PREFERRED EMBODIMENTS

Referring to the drawings, a non-aqueous electrolyte secondary cell according to the present invention will be explained in detail. The present invention, however, is not to be limited to the following embodiment but may be suitably modified without departing from the scope of the invention.

First, the structure of the non-aqueous electrolyte cell in which the non-aqueous electrolyte is the liquid-based electrolyte is explained.

Figure 1:
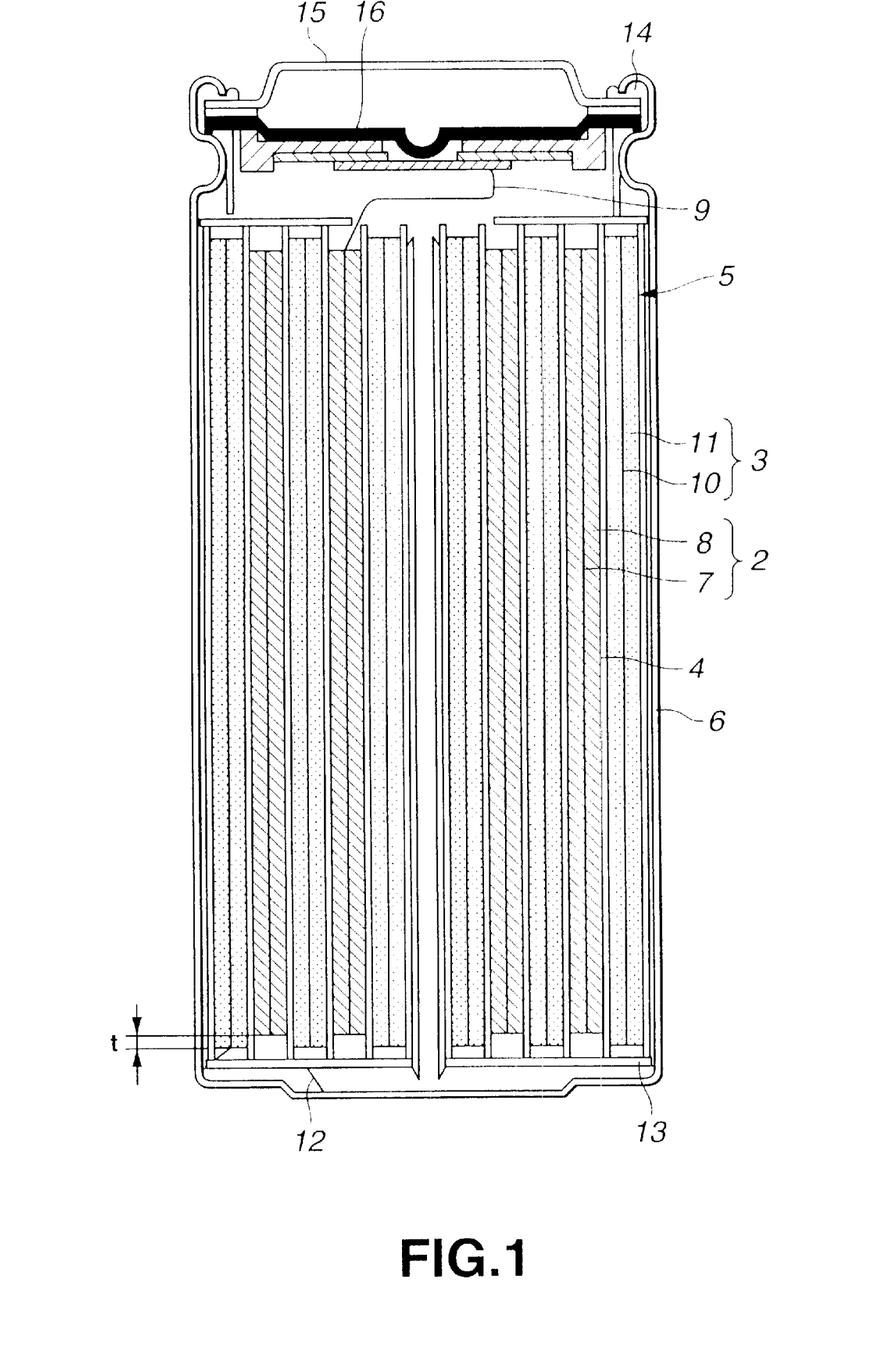
FIG. 1 is a schematic cross-sectional view showing an illustrative structure of a non-aqueous electrolyte secondary cell.

Referring to FIG. 1, a non-aqueous electrolyte secondary cell 1 includes a strip-shaped cathode material 2 and a strip-shaped anode material 3, layered together via a separator 4, and spirally coiled a plural number of times to form a cell device 5, which is housed along with the non-aqueous electrolyte solution in a cell can 6.

The cathode material 2 is made up of a cathode current collector, formed e.g., by an aluminum foil 7, on both sides of which are formed layers of a cathode active material 8 containing a cathode active material capable of reversibly electrically emitting and occluding lithium. A cathode lead 9 is mounted in the vicinity of one end of the cathode material 2.

The cathode active material contained in the layers of the cathode active material 8 is a compound of an olivinic crystal structure represented by the general formula $Li_xFe_{1-y}M_yPO_4$ where m denotes at least one of Mn, Cr, Co, Cu, Ni, V, Mo, Ti, Zn, Al, Ga, Mg, B and Nb, with $0.05 \leq x \leq 1.2$ and $0 \leq y \leq 0.8$. This compound may be used either alone or in combination.

In the present embodiment, a composite material composed of $LiFePO_4$ as later explained and a carbon material is used as a cathode active material.

In the following, a case of using $LiFePO_4$ as $Li_xFe_{1-y}M_yPO_4$ and of using a composite material of $LiFePO_4$ and a carbon material as cathode active material is explained.

The $LiFePO_4$ carbon composite material is such a material composed of $LiFePO_4$ particles on the surfaces of which are attached numerous particles of the carbon material having the particle size appreciably smaller than the particle size of the $LiFePO_4$ particles. Since the carbon material is electrically conductive, the $LiFePO_4$ carbon composite material, composed of the carbon material and $LiFePO_4$, is higher in electronic conductivity than e.g., $LiFePO_4$. That is, since the $LiFePO_4$ carbon composite material, is improved in electronic conductivity due to the carbon particles attached to the $LiFePO_4$ particles, the capacity proper to $LiFePO_4$ can be sufficiently manifested. Thus, by using the $LiFePO_4$ carbon composite material as the cathode active material, the non-aqueous electrolyte secondary cell 1 having a high capacity can be achieved.

The carbon content per unit weight in the $LiFePO_4$ carbon composite material is desirably not less than 3 wt %. If the carbon content per unit weight of the $LiFePO_4$ carbon composite material is less than 3 wt %, the amount of carbon particles attached to $LiFePO_4$ may be insufficient so that no favorable effect in improving the electronic conductivity may be realized satisfactorily.

As the carbon material forming the $LiFePO_4$ carbon composite material, such a material is preferably used which has an intensity area ratio of diffracted beams appearing at the number of waves of 1570 to 1590 $cm^{-1}$ to the diffracted beams appearing at the number of waves of 1340 to 1360 $cm^{-1}$ in the Raman spectrum of graphite in the Raman spectroscopy, or the ratio A(D/G), equal to 0.3 or higher.

The strength area ratio A(D/G) is defined as being a background-free Raman spectral intensity area ratio A(D/G) of a G-peak appearing at the number of waves of 1570 to 1590 $cm^{-1}$ and a D-peak appearing at the number of waves of 1340 to 1360 $cm^{-1}$ as measured by the Raman spectroscopic method as shown in FIG. 2. The expression "background-free" denotes the state free from noisy portions.

Among the numerous peaks of the Raman spectrum of Gr, two peaks, namely a peak termed a G-peak appearing at the number of waves of 1570 to 1590 $cm^{-1}$ and a peak termed a D-peak appearing at the number of waves of 1340 to 1360 $cm^1$, as discussed above, may be observed. Of these, the D-peak is not a peak inherent in the G-peak, but is a Raman inactive peak appearing when the structure is distorted and lowered in symmetry. So, the D-peak is a measure of a distorted structure of Gr. It is known that the intensity area ratio A (D/G) of the D- and G-peaks is proportionate to a reciprocal of the crystallite size La along the axis a of Gr.

As such carbon material, an amorphous carbon material, such as acetylene black, is preferably employed.

The carbon material having the intensity area ratio A (D/G) not less than 0.3 may be obtained by processing such as comminuting with a pulverizing device. A carbon material having an arbitrary ratio A (D/G) may be realized by controlling the pulverizing time duration.

For example, graphite, as a crystalline carbon material, may readily be destroyed in its structure by a powerful pulverizing device, such as a planetary ball mill, and thereby progressively amorphized, so that the intensity area ratio A (D/G) is concomitantly increased. That is, by controlling the driving time duration of a pulverizing device, such a carbon material having a desired A (D/G) value not less than 0.3 may readily be produced. Thus, subject to pulverization, a crystalline carbon material may also be preferably employed as a carbon material.

The powder density of the $LiFePO_4$ carbon composite material is preferably not less than 2.2 $g/cm^3$. If the material for synthesis of the $LiFePO_4$ carbon composite material is milled to such an extent that the powder density is not less than 2.2 $g/cm^3$, the resulting $LiFePO_4$ carbon composite material is comminuted sufficiently so that a non-aqueous electrolyte secondary cell 1 having a higher charging ratio of the cathode active material and a high capacity may be realized. Moreover, since the $LiFePO_4$ carbon composite material is comminuted to satisfy the aforementioned powder density, its specific surface may be said to be increased. That is, a sufficient contact area may be maintained between $LiFePO_4$ and the carbon material to improve the electronic conductivity.

If the powder density of the $LiFePO_4$ carbon composite material is less than 2.2 $g/cm^3$, the $LiFePO_4$ carbon composite material is not compressed sufficiently, so that there is a risk that the packing ratio of the active material cannot be improved at the cathode 4.

On the other band, the Bulnauer Emmet Teller (BET) specific surface area in the $LiFePO_4$ carbon composite material is preferably not less than 10.3 $m^2/g$. If the BET specific surface area of the $LiFePO_4$ carbon composite material is not less than 10.3 $m^2/g$, the surface area of $LiFePO_4$ per unit weight can be sufficiently increased to increase the contact area between $LiFePO_4$ and the carbon material to improve the electronic conductivity of the cathode active material satisfactorily.

The primary particle size of the $LiFePO_4$ carbon composite material is preferably not larger than 3.1 μm. By the primary particle size of the $LiFePO_4$ carbon composite material being not larger than 3.1 μm, the surface area of $LiFePO_4$ per unit area may be sufficiently increased to increase the contact area between $LiFePO_4$ and the carbon material to improve the electronic conductivity of the cathode active material.

The binder contained in the layer of the cathode active material may be formed of any suitable known resin material routinely used as the binder for the layer of the cathode active material for this sort of the non-aqueous electrolyte cell.

Since the olivinic lithium phosphorus oxide is used as the cathode active material as described above, the thickness of the layer of the cathode active material is set within a range of 25 to 110 µm. It should be noted that, since the cathode active material is coated to each side of the aluminum foil 7 in the present embodiment, the thickness is a sum corresponding to a range from 50 to 220 µm.

If the thickness of the layer of the cathode active material 8 is less than 25 µm, with the thickness of the two layers being less than 50 µm, the proportion of the current collector in the in-cell volume is increased excessively to lower the cell capacity. If conversely the thickness of the layer of the cathode active material 8 exceeds 110 µm, with the sum total of the two layers on both sides of the aluminum foil 7 being 220 µm, the problem of the lowering of load characteristics is raised.

An anode material 3 is made up of an anode current collector 10, formed e.g., by a nickel foil or a copper foil, and a layer of an anode active material 11 formed on each surface of the anode current collector 10. An anode lead 12 is mounted to the vicinity of the anode material 3.

The anode active material of the layer of the anode active material 11 is such a material capable of doping/undoping lithium. As thus anode active material, capable of doping/undoping lithium, metal lithium, lithium alloys, lithium-doped electrically conductive high molecular materials, carbonaceous materials or layered compounds, such as metal oxides, can be used. The binder contained in the layer of the anode active material 11 may be any suitable known binder routinely used in this sort of the non-aqueous electrolyte secondary cell.

In the non-aqueous electrolyte secondary cell 1, if the width-wise ends of the anode material 3 are coincident with or offset inwardly of the width-wise ends of the cathode material 2, lithium ions tend to be precipitated as metal lithium at both width-wise ends of the anode material 3 to obstruct the charging/discharging reaction. Thus, in the non-aqueous electrolyte secondary cell 1, the anode material 3 is formed to be of a width broader than the cathode material 2. It should be noted that, with LiFePO$_4$ used as the cathode active material, the amount of Li discharged during charging/discharging is lesser than with e.g., LiCoO$_2$, such that the amount of metal lithium precipitated is decreased. Thus, if one end of the anode material 3 is larger by 0.05 mm or more than the corresponding end of the cathode material 2, charging/discharging may proceed without being influenced by precipitated metal lithium, whereas, if the one end of the anode material 3 is larger by less than 0.05 mm than the corresponding end of the cathode material 2, the end of the anode material 3 tends to be coincident with or inwardly offset with respect to the corresponding end of the cathode material 2. If the width at one end of the anode material 3 is larger by 2.0 mm or more than the that at the corresponding end of the cathode material 2, the amount of the anode active material not contributing to the cell reaction is increased to lower the energy density of the cell. It is therefore desirable that the anode material 3 is broader in width than the cathode material 2 so that a difference t in the width-wise dimension on one side shown in FIG. 1 will be in a range of 0.05 mm to 0.2 mm.

The separator 4 serves for separating the layer of the cathode active material 8 of the cathode material 2 from the layer of the anode active material 11 of the anode material 3, and may be formed by a film of any suitable known material routinely used as a separator for this sort of the non-aqueous electrolyte secondary cell, such as, for example, a film of a high molecular material, e.g., polypropylene. The separator 4 needs to be as thin in thickness as possible in view of the relation between the lithium ion conductivity and the energy density. Specifically, the separator thickness of, for example, 50 µm or less, is desirable.

In the non-aqueous electrolyte secondary cell 1, the aforementioned cathode material 2 and the anode material 3 are layered together via separator 4, and coiled a plural number of times to form the cell device 5.

As the non-aqueous electrolyte solution, such a solution obtained on dissolving an electrolyte in a non-protonic aqueous solvent is used.

As the non-aqueous solvent, propylene carbonate, ethylene carbonate butylene carbonate, vinylene carbonate, γ-butyrolactone, sulforane, 1,2-dimethoxyethane, 1,2-diethoxyethane, 2-methyl tetrahydrofuran, 3-methyl-1,3-dioxolane, methyl propionate, methyl lactate, dimethyl carbonate, diethyl carbonate and dipropyl carbonate, for example, may be used. In view of voltage stability, cyclic carbonates, such as propylene carbonate, ethylene carbonate, butylene carbonate or vinylene carbonate, and chained carbonates, such as dimethyl carbonate, diethyl carbonate and dipropyl carbonate, are preferably used. These non-aqueous solvents may be used alone or in combination.

As the electrolytes dissolved in the non-aqueous solvent, lithium salts, such as LiPF$_6$, LiClO$_4$, LiAsF$_6$, LiBF$_4$, LiCF$_3$SO$_3$ or LiN(CF$_3$SO$_2$)$_2$, may be used. Of these lithium salts, LiPF$_6$ and LiBF$_4$ are preferred.

The cell can 6, the inner surface of which is plated with nickel, is used for housing the cell device 5 and the non-aqueous electrolyte.

The method for the preparation of the non-aqueous electrolyte cell 1, constructed as described above, is hereinafter explained.

First, a composite material of Li$_x$FePO$_4$ and the carbon material, as a cathode active material, is synthesized by a manufacturing method as now explained.

For synthesizing the cathode active material, Li$_x$FePO$_4$ as a starting material for synthesis is kneaded together, milled and sintered. At an optional time point in the course of the mixing, milling and sintering, a carbon material is added to the kneaded starting materials for synthesis. As the Li$_x$FePO$_4$ starting materials for synthesis, Li$_3$PO$_4$, Fe$_3$(PO$_4$)$_2$ or a hydrate Fe$_3$(PO$_4$)$_2$.nH$_2$O thereof where n denotes the number of hydrates, are used.

In the following, such a case is explained in which lithium phosphate Li$_3$PO$_4$ and a hydrate Fe$_3$(PO$_4$)$_2$.8H$_2$O thereof, synthesized as explained below, are used as starting materials for synthesis, and in which, after adding a carbon material to these starting materials for synthesis, a number of process steps are carried out to synthesize the LiFePO$_4$ carbon composite material.

First, the LiFePO$_4$ starting materials for synthesis and the carbon material are mixed together to form a mixture by way of a mixing step. The mixture from the mixing step is then milled by a milling process, and the milled mixture then is fired by way of performing a sintering process.

In the mixing process, lithium phosphate and iron phosphate I octahydrate are mixed together at a pre-set ratio and further added to with a carbon material to form a mixture.

This iron phosphate I octahydrate, used as a starting material for synthesis, is synthesized by adding disodium hydrogen phosphate dodecahydrate (2Na$_2$HPO$_4$.12H$_2$O) to an aqueous solution obtained on dissolving iron phosphate heptahydrate ($FeSO_4 \cdot 7H_2O$) in water and by allowing the resulting mass to dwell for a pre-set time. The reaction of synthesis of iron phosphate I octahydrate may be represented by the following chemical formula (1):

$$3FeSO_4 \cdot 7H_2O + 2Na_2HPO_4 \cdot 12H_2O \rightarrow Fe_3(PO_4)_2 \cdot 8H_2O + 2Na_2SO_4 + 37H_2O \quad (1)$$

In iron phosphate I octahydrate, as the material for synthesis, there is contained a certain amount of $Fe^{3+}$ from the synthesis process. If $Fe^{3+}$ is left in the material for synthesis, a trivalent Fe compound is generated by sintering to obstruct single-phase synthesis of the $LiFePO_4$ carbon composite material. It is therefore necessary to add a reducing agent to the starting materials for synthesis prior to sintering and to reduce $Fe^{3+}$ contained in the starting materials for synthesis to $Fe^{2+}$ at the time of firing.

However, there is a limitation to the capability of the reducing agent in reducing $Fe^{3+}$ to $Fe^{2+}$ by the reducing agent, such that, if the content of $Fe^{3+}$ in the starting materials for synthesis is excessive, it may be an occurrence that $Fe^{3+}$ is not reduced in its entirety but is left in the $LiFePO_4$ carbon composite material.

It is therefore desirable that the content of $Fe^{3+}$ in the total iron in the iron phosphate I octahydrate be set to 61 wt % or less. By limiting the content of $Fe^{3+}$ in the total iron in the iron phosphate I octahydrate to 61 wt % or less from the outset, single-phase synthesis of the $LiFePO_4$ carbon composite material can be satisfactorily achieved without allowing $Fe^{3+}$ to be left at the time of firing, that is without generating impurities ascribable to $Fe^{3+}$.

It should be noted that, the longer the dwell time in generating iron phosphate I octahydrate, the larger becomes the content of $Fe^{3+}$ in the generated product, so that, by controlling the dwell time so as to be equal to a preset time, iron phosphate I octahydrate having an optional $Fe^{3+}$ can be produced. The content of $Fe^{3+}$ in the total iron in the iron phosphate I octahydrate can be measured by the Mossbauer method.

The carbon material added to the starling materials for synthesis acts as a reducing agent for reducing $Fe^{3+}$ to $Fe^{2+}$, at the time of sintering, even if $Fe^{2+}$ contained in iron phosphate I octahydrate as the starting materials for synthesis is oxidized to $Fe^{3+}$ by oxygen in atmosphere or due to sintering. Therefore, even if $Fe^{3+}$ is left in the starting materials for synthesis, impurities may be prevented from being generated to assure single-phase synthesis of the $LiFePO_4$ carbon composite material. Moreover, the carbon material acts as an antioxidant for preventing oxidation of $Fe^{2+}$ contained in the starting materials for synthesis to $Fe^{3+}$. That is, the carbon material prevents oxidation to $Fe^{3+}$ of $Fe^{2+}$ by oxygen present in atmosphere and in a firing oven prior to or during sintering.

That is, the carbon material acts not only as an electrification agent for improving the electronic conductivity of the cathode active material but also as a reducing agent and as an antioxidant. Meanwhile, since this carbon material is a component of the $LiFePO_4$ carbon composite material, there is no necessity of removing the carbon material following synthesis of the $LiFePO_4$ carbon composite material. The result is the improved efficiency in the preparation of the $LiFePO_4$ carbon composite material.

It is noted that the carbon content per unit weight of the $LiFePO_4$ carbon composite material be not less than 3 wt %. By setting the carbon content per unit weight of the $LiFePO_4$ carbon composite material to not less than 3 wt %, it is possible to utilize the capacity and cyclic characteristics inherent in $LiFePO_4$ to its fullest extent.

In the milling process, the mixture resulting from the mixing process is subjected to milling in which pulverization and mixing occur simultaneously. By the milling herein is meant the powerful comminuting and mixing by a ball mill. As the ball mill, a planetary ball mill, a shaker ball mill or a mechano-fusion may selectively be employed.

By milling the mixture from the mixing process, the starting materials for synthesis and the carbon material can be mixed homogeneously. Moreover, if the starting materials for synthesis is comminuted by milling, the specific surface area of the starting materials for synthesis can be increased, thereby increasing the contact points of the starting materials for synthesis to accelerate the synthesis reaction in the subsequent sintering process.

It is desirable that, by milling the mixture containing the starting materials for synthesis, the particle size distribution of the particle size not less than 3 $\mu$m be not larger than 22% in terms of the volumetric integration frequency. With the particle size distribution of the starting materials for synthesis in the above range, the starting materials for synthesis has a surface area sufficient to produce surface activity for carrying out the synthesis reaction. Thus, even if the sintering temperature is of a low value of e.g., 600° C. which is lower than the melting point of the starting materials for synthesis, the reaction efficiency is optimum, thus realizing the single-phase synthesis of the $LiFePO_4$ carbon composite material satisfactorily.

Moreover, the milling is desirably executed so that the powder density of the $LiFePO_4$ carbon composite material will be 2.2 g/cm³ or higher. By comminuting the starting materials for synthesis to give the above defined powder density, the specific surface area of $LiFePO_4$ and hence the contact area between $LiFePO_4$ and the carbon material can be increased to improve the electronic conductivity of the cathode active material.

Thus, by milling the mixture containing the starting material for synthesis, such a cathode active material can be produced which will give a high capacity non-aqueous electrolyte secondary cell 1.

In the sintering step, the mixture obtained on compaction in the compression step is sintered. By sintering the mixture, lithium phosphate may be reacted with iron phosphate I octahydrate to synthesize $LiFePO_4$.

The synthesis reaction of $LiFePO_4$ may be represented by the following reaction formula (2):

$$Li_3PO_4 + Fe_3(PO_4)_2 \cdot nH_2O \rightarrow 3LiFePO_4 + nH_2O \quad (2)$$

where n denotes the number of hydrates and is equal to 0 for an anhydride. In the chemical formula (2), $Li_3PO_4$ is reacted with $Fe_3(PO_4)_2$ or its hydrate $Fe_3(PO_4)_2 \cdot nH_2O$ where n denotes the number of hydrates.

As may be seen from the chemical formula (2), no by-product is yielded if $Fe_3(PO_4)_2$ is used as a starting materials for synthesis. On the other hand, if $Fe_3(PO_4)_2 \cdot nH_2O$ is used, water, which is non-toxic, is by-produced.

Heretofore, lithium carbonate, ammonium dihydrogen phosphate and iron acetate II, as syntheses materials, are mixed at a pre-set ratio and sintered to synthesize $LiFePO_4$ by the reaction shown by the chemical formula (3):

$$Li_2CO_3 + 2Fe(CH_3COO)_2 + 2NH_4H_2PO_4 \rightarrow 2LiFePO_4 + CO_2 + H_2O + 2NH_3 + 4CH_3COOH \quad (3)$$

As may be seen from the reaction formula, toxic by-products, such as ammonia or acetic acid, are generated on sintering with the conventional synthesis method for $LiFePO_4$. So, a large-scale equipment, such as gas collector, is required for processing these toxic by-products, thus raising the cost. In addition, the yield of $LiFePO_4$ is lowered because these by-products are generated in large quantities.

According to the present invention, in which $Li_3PO_4$, $Fe_3(PO_4)_2$ or its hydrate $Fe_3(PO_4)_2 \cdot nH_2O$, where n denotes the number of hydrates, is used as the starting material for synthesis, the targeted $LiFePO_4$ can be produced without generating toxic by-products. In other words, safety in sintering may be appreciably improved as compared to the conventional manufacturing method. Moreover, while a large-scale processing equipment is heretofore required for processing toxic by-products, the manufacturing method of the present invention yields only water, which is innoxious, as a by-product, thus appreciably simplifying the processing step to allow to reduce size of the processing equipment. The result is that the production cost can be appreciably lower than if ammonia etc which has to be processed is by-produced in the conventional system. Moreover, since the by-product is yielded only in minor quantities, the yield of $LiFePO_4$ may be improved significantly.

Although the sintering temperature in sintering the mixture may be 400 to 900° C. by the above synthesis method, it is preferably 600° C. or thereabouts in consideration of the cell performance. If the sintering temperature is less than 400° C., neither the chemical reaction nor crystallization proceeds sufficiently such that the phase of impurities such as $Li_3PO_4$ of the starting materials for synthesis may persist and hence the homogeneous $LiFePO_4$ may not be produced. If conversely the sintering temperature exceeds 900° C., crystallization proceeds excessively so that the $LiFePO_4$ particles are coarse in size to decrease the contact area between $LiFePO_4$ and the carbon material to render it impossible to achieve sufficient discharging capacity.

During sintering, Fe in the $LiFePO_4$ carbon composite material synthesized is in the bivalent state. So, in the temperature of the order of 600° C. as the synthesis temperature, Fe in the $LiFePO_4$ carbon composite material is promptly oxidized to $Fe^{3+}$ by oxygen in the sintering atmosphere in accordance with the chemical formula shown by the chemical formula (4):

$$6LiFePO_4 + 3/2O_2 \rightarrow 2Li_3Fe_2(PO_4)_3 + Fe_2O_3 \quad (4)$$

so that impurities such as trivalent Fe compounds are produced to obstruct the single-phase synthesis of the $LiFePO_4$ carbon composite material.

So, inert gases, such as nitrogen or argon, or reducing gases, such as hydrogen or carbon monoxide, are used as the sintering atmosphere, while the oxygen concentration in the sintering atmosphere is prescribed to a range within which Fe in the $LiFePO_4$ carbon composite material is not oxidized, that is to not larger than 1012 ppm (volume). By setting the oxygen concentration in the sintering atmosphere to 1012 ppm (volume) or less, it is possible to prevent Fe from being oxidized even at the synthesis temperature of 600° C. or thereabouts to achieve the single-phase synthesis of the $LiFePO_4$ carbon composite material.

If the oxygen concentration in the sintering atmosphere is 1012 ppm in volume or higher, the amount of oxygen in the sintering atmosphere is excessive, such that Fe in the $LiFePO_4$ carbon composite material is oxidized to $Fe^{3+}$ to generate impurities to obstruct the single-phase synthesis of the $LiFePO_4$ carbon composite material.

As for takeout of the sintered $LiFePO_4$ carbon composite material, the takeout temperature of the sintered $LiFePO_4$ carbon composite material, that is the temperature of the $LiFePO_4$ carbon composite material exposed to atmosphere, is desirably 305° C. or lower. On the other hand, the takeout temperature of the sintered $LiFePO_4$ carbon composite material is more desirably 204° C. or lower. By setting the takeout temperature of the $LiFePO_4$ carbon composite material to 305° C. or lower, Fe in the sintered $LiFePO_4$ carbon composite material is oxidized by oxygen in atmosphere to prevent impurities from being produced.

If the sintered $LiFePO_4$ carbon composite material is taken out in an insufficiently cooled state, Fe in the $LiFePO_4$ carbon composite material is oxidized by oxygen in atmosphere, such that impurities tend to be produced. However, if the $LiFePO_4$ carbon composite material is cooled to too low a temperature, the operating efficiency tends to be lowered.

Thus, by setting the takeout temperature of the sintered $LiFePO_4$ carbon composite material to 305° C. or lower, it is possible to prevent Fe in the sintered $LiFePO_4$ carbon composite material from being oxidized by oxygen in atmosphere and hence to prevent impurities from being generated to maintain the operation efficiency as well as to synthesize the $LiFePO_4$ carbon composite material having desirable cell characteristics with high efficiency.

Meanwhile, the cooling of the as-sintered $LiFePO_4$ carbon composite material is carried out in a sintering furnace. The cooling method used may be spontaneous cooling or by forced cooling. However, if a shorter cooling time, that is a higher operating efficiency, is envisaged, forced cooling is desirable. In case the forced cooling is used, it is sufficient if a gas mixture of oxygen and inert gases, or only the inert gases, are supplied into the sintering furnace so that the oxygen concentration in the sintering furnace will be not higher than the aforementioned oxygen concentration, that is, 1012 ppm (volume) or less.

In the above, the carbon material is added prior to the milling step. Alternatively, the carbon material may also be added after the milling step or after the sintering step.

However, if the carbon material is added after the sintering step, the reducing effect or the oxidation preventative effect during sintering cannot be obtained, such that the addition is useful only for improving the electrical conductivity. Thus, in case the carbon material is added after the sintering step, it becomes necessary to prevent $Fe^{3+}$ from being left over by other suitable measures.

It is noted that, if the carbon material is added after the sintering step, the product synthesized on sintering is not the $LiFePO_4$ carbon composite material but is $LiFePO_4$. So, milling is again applied after the carbon material is added to $LiFePO_4$ synthesized on sintering. By this second milling, the carbon material added is comminuted and hence is more liable to become attached to the surface of $LiFePO_4$. Moreover, by this second milling, $LiFePO_4$ and the carbon material are mixed sufficiently to permit the comminuted carbon material to be attached uniformly to the surface of $LiFePO_4$. So, even in case the carbon material is added after sintering, it is possible to obtain a product similar to one obtained on addition of a carbon material prior to milling, that is the $LiFePO_4$ carbon composite material, as well as to achieve the favorable effect similar to that described above.

A non-aqueous electrolyte cell 1, employing the $LiFePO_4$ carbon composite material, produced as described above, as the cathode active material, is prepared e.g., as follows.

As the cathode material 2, the $LiFePO_4$ carbon composite material as the cathode active material and a binder are dispersed in a solvent to prepare a slurried cathode mixture. The so produced cathode mixture is evenly coated on the cathode current collector 7 and dried in situ to form the layer of the cathode active material 8 to prepare the cathode material 2.

The cathode mixture is coated so that the film thickness of the layer of the cathode active material 8 on one side of the aluminum foil 7 is 25 to 110 μm, with the sum of the film thicknesses on both sides thereof being 50 to 220 μm.

As the binder for the cathode mixture, any suitable known binder may be used. Alternatively, any suitable known binder may be added to the aforementioned cathode mixture.

In the present embodiment, the $LiFePO_4$ carbon composite material is used as the cathode active material. However, the present invention is not limited thereto. In the present invention, $LiFePO_4$ by itself may be used as the cathode active material, or a compound represented by the general formula $Li_xFe_{1-y}M_yPO_4$ of the olivinic structure and which is different from $LiFePO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, may be used as the cathode active material either singly or in combination with other materials. These compounds may be enumerated by, for example, $LiFe_{0.2}Mn_{0.8}PO_4$, $LiFe_{0.2}Cr_{0.8}PO_4$, $LiFe_{0.2}Co_{0.8}PO_4$, $LiFe_{0.2}Cu_{0.8}PO_4$, $LiFe_{0.2}Ni_{0.8}PO_4$, $LiFe_{0.25}V_{0.75}PO_4$, $LiFe_{0.25}Mo_{0.75}PO_4$, $LiFe_{0.25}Ti_{0.75}PO_4$, $LiFe_{0.3}Zn_{0.7}PO_4$, $LiFe_{0.3}Al_{0.7}PO_4$, $LiFe_{0.3}Ga_{0.7}PO_4$, $LiFe_{0.25}Mg_{0.75}PO_4$, $LiFe_{0.25}B_{0.75}PO_4$ and $LiFe_{0.25}Nb_{0.75}PO_4$.

In preparing the anode material 3, the anode active material and the cathode active material are first dispersed in a solvent to form a slurried anode mixture. The so produced anode mixture is evenly coated on the anode current collector and dried in situ to form a layer of the anode active material to prepare the anode material 3. As the binder for the anode mixture, any suitable known binder may be used. Alternatively, any suitable known binder may be added to the anode mixture.

The width-wise dimension of the anode material 3 is selected to be larger than that of the cathode material 2. Preferably, the anode material 3 is formed to be 0.05 to 2.0 mm broader in width than the cathode material 2.

The cathode material 2 and the anode material 3, thus produced, are layered together, via separator 4, and coiled together a plural number of times, to complete the cell device 5.

The non-aqueous electrolyte solution is prepared by dissolving an electrolyte salt in a non-aqueous solvent.

The cell device 5 is housed via insulating plate 13 in a cell can 6 into which the non-aqueous electrolyte solution then is charged. A lid 15 and a safety valve device 16 are caulked together to the cell can 6 via gasket 14 to complete the non-aqueous electrolyte secondary cell 1.

In the so produced non-aqueous electrolyte cell 1, in which the thickness of the layer of the cathode active material is set to an optimum range, the load characteristics and the cell capacity may be compromised to each other to realize a non-aqueous electrolyte secondary cell having superior cell characteristics.

In the foregoing, the cathode active material is synthesized by a mixing step of mixing the starting material for synthesis of $LiFePO_4$ and the carbonaceous material, a step of milling the resulting mixture and a step of sintering the mixture milled in the milling step. The present invention, however, is not limited to this merely exemplary process. Thus, the step of addition of the carbon material and/or the milling step in the above process may be omitted if so desired.

There is no particular limitation to the shape of the non-aqueous electrolyte cell 1 of the above-mentioned embodiment, such that the cell may be cylindrically-shaped, square-shaped, coin-shaped or button-shaped, while it may be of a thin type or of a larger format.

Although the non-aqueous electrolyte cell, explained above, is the non-aqueous electrolyte secondary cell 1 employing a non-aqueous electrolyte solution, the present invention is not limited thereto, but may be applied to such a cell employing a solid electrolyte as the non-aqueous electrolyte. The solid electrolyte used may be an inorganic solid electrolyte or a high molecular solid electrolyte, such as gel electrolyte, provided that the material used exhibits lithium ion conductivity. The inorganic solid electrolyte may be enumerated by lithium nitride and lithium iodide. The high molecular solid electrolyte is comprised of an electrolyte salt and a high molecular compound dissolving it. The high molecular compound may be an etheric high molecular material, such as poly(ethylene oxide), cross-linked or not, a poly(methacrylate) ester based compound, or an acrylate-based high molecular material, either alone or in combination in the state of being copolymerized or mixed in the molecules. In this case, the matrix of the gel electrolyte may be a variety of high molecular materials capable of absorbing and gelating the non-aqueous electrolyte solution. As these high molecular materials, fluorine-based high molecular materials, such as, for example, poly(vinylidene fluoride) or poly(vinylidene-fluoride-CO-hexafluoropropylene), etheric high molecular materials, such as polyethylene oxide, cross-linked or not, or poly(acrylonitrile), may be used. Of these, the fluorine-based high molecular materials are particularly desirable in view of redox stability.

EXAMPLES

The present invention is now explained with reference to specified Examples based on experimental results.

Experiment 1

In the present Experiment, the $LiFePO_4$ carbon composite material was synthesized and, using the so-produced $LiFePO_4$ carbon composite material as the cathode active material, a non-aqueous electrolyte cell was prepared to evaluate its characteristics.

A $LiFePO_4$ carbon composite material was prepared as a cathode active material. The method for producing the cathode active material is hereinafter explained.

First, $Li_3PO_4$ and $Fe_3(PO_4)_2 \cdot 8H_2O$ were mixed to give an elementary ratio of lithium to iron equal to 1:1. To the resulting mixture were added acetylene black powders, as the amorphous carbon material, so that the acetylene black powders account for 10 wt % of the sintered product in its entirety. The mixture and the alumina balls, each 10 mm in diameter, were charged into an alumina pot 100 mm in diameter, with the weight ratio of the mixture to the alumina balls equal to 1:2. The mixture was milled using a planetary ball mill. As this planetary ball mill, a planetary rotating pot mill for test, manufactured by ITO SEISAKUSHO KK under the trade name of $LA-PO_4$, was used, and the mixture was milled under the following conditions:

Conditions for Planetary Ball Milling radius of rotation about sun gear: 200 mm number of revolutions about the sun gear: 250 rpm number of revolutions about a planetary gear itself: 250 rpm driving time duration: 10 hours.

The milled mixture was charged into a ceramic crucible and sintered for five hours at a temperature of 600° C. in an electrical furnace maintained in a nitrogen atmosphere to produce an $LiFePO_4$ carbon composite material.

The so produced LiFePO$_4$ composite carbon material, graphite, as an electrification agent, and polyvinylidene fluoride, as a binder, were mixed together to prepare a cathode mixture, which was then dispersed in N-methyl-2-pyrrolidone to form a slurry.

The slurried cathode mixture was then evenly coated on both sides of a strip-shaped aluminum foil, 20 μm thick and 56 mm in width, as a cathode current collector, to form a layer of the cathode active material. The resulting product was dried and compression-molded in a roll press to form a strip-shaped cathode. The design density of the layer of the cathode active material was 2.3 g/cm$^3$.

A variety of sample cells were prepared as the thickness of the layer of the cathode active material was changed as shown in Table 1.

As the petroleum pitch was used as an anode active material. Into this anode active material were introduced 10 to 20% of oxygen-containing functional groups. The resulting product was subjected to so-called oxygen cross-linking, and sintered at 1000° C. in an inert gas stream to produce a carbon material which is difficult to graphize and which exhibits properties close to those of the vitreous carbon. The results of the X-ray diffractometry revealed that the plane-to-plane dimension of the (002) plane and the true specific gravity were 3.76 Å and 1.58, respectively.

90 parts by weight of the so produced carbon material and 10 parts by weight of polyvinylidene fluoride as a binder were mixed together to prepare an anode mixture which then was dispersed in N-methyl-2-pyrrolidone to form a slurry.

A strip-shaped copper foil, 10 μm in thickness and 58 mm in width, was provided as an anode current collector. The slurried anode mixture was evenly coated on both sides of the foil, dried and compression-molded on a roll press to prepare a strip-shaped anode. The anode mixture was coated so that the anode capacity will amount to 130% of the cathode capacity.

As a separator, a micro-porous polypropylene film, 25 μm, was used. The anode, cathode and the separator were wound in a helical pattern to complete a cell device.

The so prepared cell device was housed in a nickel-plated iron can. An insulating plate was placed on upper and lower sides of the helically wound cell device. An aluminum cathode lead was taken out from the cathode current collector and welded to a cell lid, whilst a nickel anode lead was taken out from the anode current collector and welded to the cell can.

In this cell can was charged an electrolyte solution obtained on dissolving LiPF$_6$ in a mixed solvent of 50 vol % of propylene carbonate (PC) and 50 vol % of dimethyl carbonate (DMC) at a rate of 1 mol/l.

Finally, the cell can and the cell lid were caulked together via an insulating gasket to prepare a cylindrically-shaped cell.

For respective sample cells, prepared with variable thicknesses of the layer of the cathode active material, the cell capacity and load characteristics were measured and evaluated.

Meanwhile, the cell capacity and load characteristics were evaluated as follows:

First, constant current constant voltage charging of 23° C. and 1A was carried out for the respective cells, up to an upper limit of 4.2V, and subsequently a constant current discharge at 100 mA was carried out up to a terminating voltage of 2.0 V. The discharge capacity at this time was used as the initial discharge capacity.

The respective cells were charged with 1C and discharged with 0.2C up to the terminal voltage of 2.0V to find the 0.2C discharge capacity.

Similarly, 1C charging and 3C discharge were carried out in similar manner to find the 3C discharge capacity. The 3C discharge capacity upkeep ratio (%), in case the 0.2C discharge capacity was set to 100, was found and evaluated as load characteristics. The results are shown in Table 1.

TABLE 1

| | | | | | | | | |
|---|---|---|---|---|---|---|---|---|
| thickness of layer of cathode active material (one side; μM) | 15 | 25 | 50 | 75 | 90 | 110 | 125 | 140 |
| sum of film thicknesses on both sides (μm) | 30 | 50 | 100 | 150 | 180 | 220 | 250 | 280 |
| proportion of current collector in cathode volume (%) | 27 | 18 | 10 | 7 | 6 | 5 | 4 | 4 |
| 0.2 C discharge capacity (mAh) | 484 | 722 | 1040 | 1194 | 1253 | 1310 | 1343 | 1370 |
| 3 C discharge capacity (mAh) | 470 | 701 | 1006 | 1150 | 1195 | 1194 | 1081 | 940 |
| 3 C discharge capacity upkeep ratio vs 0.2 C discharge capacity upkeep ratio | 97.2 | 97.1 | 96.7 | 96.3 | 95.4 | 91.1 | 80.5 | 68.6 |
| cell evaluation | X | ○ | ○ | ○ | ○ | ○ | X | X |

As cell characteristics, the discharge capacity and the load characteristics in terms of the 3C discharge capacity of not less than 700 mAh and of not less than 80%, respectively, are desirable. If Table 1 is checked in this perspective, it is desirable that the thickness of the layer of the cathode active material be set to not less than 25 μm (the sum of the film thicknesses on both sides being not less than 50 μm) and not larger than 110 μm (the sum of film thicknesses on both sides being not larger than 220 μm).

Similar cells were prepared using, in place of LiFePO$_4$ carbon composite material, a LiFe$_{0.2}$Mn$_{0.8}$PO$_4$ carbon composite material, a LiFe$_{0.2}$Cr$_{0.8}$PO$_4$ carbon composite material, a LiFe$_{0.2}$Co$_{0.8}$PO$_4$ carbon composite material, a LiFe$_{0.2}$Cu$_{0.8}$PO$_4$ carbon composite material, a LiFe$_{0.2}$Ni$_{0.8}$PO$_4$ carbon composite material, a LiFe$_{0.25}$V$_{0.75}$PO$_4$ carbon composite material, a LiFe$_{0.25}$Mo$_{0.75}$PO$_4$ carbon composite material, a LiFe$_{0.25}$Ti$_{0.75}$PO$_4$ carbon composite material, a LiFe$_{0.3}$Zn$_{0.7}$PO$_4$ carbon composite material, a LiFe$_{0.3}$Al$_{0.7}$PO$_4$ carbon composite material, a LiFe$_{0.3}$Ga$_{0.7}$PO$_4$ carbon composite material, a LiFe$_{0.25}$Mg$_{0.75}$PO$_4$ carbon composite material, a LiFe$_{0.25}$B$_{0.75}$PO$_4$ carbon composite material and a LiFe$_{0.25}$Nb$_{0.75}$PO$_4$ carbon composite material, and conducted similar evaluation. It was found that, by setting the thickness of the layer of the cathode active material to not less than 25 μm and not larger than 110 μm on one side, with the sum of the film thicknesses on both sides being not less than 50 μm and not larger than 220 μm, a high cell capacity and high load characteristics can be obtained.

Experiment 2

In the present Experiment, characteristics of a polymer cell for variable film thicknesses of the layer of the cathode active material were checked.

First, an anode was prepared as follows:

90 parts by weight of graphite powders and 10 parts by weight of poly (vinylidene fluoride-co-hexafluoropropylene) were mixed to prepare an anode mixture, which then was dispersed in N-methyl-2-pyrrolidone to form a slurry. This slurry was then evenly coated on one surface of a strip-shaped copper foil, 10 μm in thickness, as an anode current collector, dried and compression molded by a roll press to prepare an anode.

A cathode then was prepared as follows:

85 parts by weight of the $LiFePO_4$ carbon composite material, prepared in Experiment 1, 10 parts by weight of graphite, as an electrification agent, and 5 parts by weight of poly (vinylidene fluoride) as fluorine resin powders, operating as a binder, were mixed together to prepare a cathode mixture, to which N-methylpyrrolidone was added to form a slurry.

This cathode mixture was dispersed in N-methyl-2-pyrrolidone to from a slurry which was evenly coated on both sides of an aluminum foil, 20 μm in thickness, which is to be a cathode current collector. The resulting product was dried in situ to form a layer of a cathode active material, which was compression-molded by a roll press to form a cathode. Various sample cells were prepared as the thickness of the layer of the cathode active material was changed, as shown in Table 2.

A cathode terminal lead of aluminum and an anode terminal lead of nickel were welded to the portions of the cathode and the anode not carrying the layers of the active materials. It should be noted that the cathode and the anode are an aluminum foil and a copper foil, respectively.

A gel electrolyte was further prepared as follows:

A sol-like electrode was first prepared as follows: First, polyvinylidenefluoride, copolymerized with 6.9 wt % of hexafluoropropylene, a non-aqueous electrolyte solution, and dimethyl carbonate, were mixed, agitated and dissolved to a sol-like electrolytic solution. To the sol-like electrolytic solution was added 0.5 wt % of vinylene carbonate VC to form a gelated electrolytic solution. As the non-aqueous electrolyte solution, such a solution obtained on mixing ethylene carbonate EC and propylene carbonate PC at a volumetric ratio of 6:4 and on dissolving $LiPF_6$ at a rate of 0.85 mol/kg in the resulting mixture was used.

The above gelated electrolyte solution was evenly coated on the anode and the cathode for impregnation. The resulting product was allowed to stand at ambient temperature for eight hours and dimethyl carbonate was vaporized off to yield a gel electrolyte.

The anode and the cathode, coated with the gel electrolyte, were stacked together, with the gel electrode sides facing each other via a separator of a micro-porous polypropylene film 25 μm in thickness, pressured and wound to form a wound type gel electrolyte cell device.

The cell device was encapsulated in a laminate film and thermally fused with a sealing width of 5 mm by a sealer, under the conditions of 200° C. and 10 seconds, to prepare a test cell.

The cell capacity and the load characteristics were measured and evaluated of the respective sample cells prepared with the variable thicknesses of the respective sample cells.

The cell capacity and the load characteristics were evaluated by the following method.

First, constant current constant voltage charging of 23° C. and 0.5A was carried out for the respective cells, up to an upper limit of 4.2V, for three hours, and subsequently a constant current discharge at 50 mA was carried out up to a terminating voltage of 2.0 V. The discharge capacity at this time was used as the initial discharge capacity.

The respective cells were charged with 1C and discharged with 0.2C up to the terminal voltage of 2.0V to find the 0.2C discharge capacity.

Similarly, 1C charging was carried out in similar manner to find the 3C discharge capacity. The 3C discharge capacity upkeep ratio (%), in case the 0.2C discharge capacity was set to 100, was found and evaluated as load characteristics. The results are shown in Table 2.

TABLE 2

| thickness of layer of cathode active material (one side; μM) | 15 | 25 | 75 | 110 | 125 |
|---|---|---|---|---|---|
| sum of film thicknesses on both sides (μm) | 30 | 50 | 150 | 220 | 250 |
| proportion of current collector in cathode volume (%) | 32 | 22 | 9 | 6 | 5 |
| 0.2 C discharge capacity (mAh) | 244 | 381 | 677 | 755 | 777 |
| 3 C discharge capacity upkeep ratio vs 0.2 C discharge capacity upkeep ratio | 94.3 | 92.2 | 88.9 | 74.3 | 54.9 |
| cell evaluation | X | ○ | ○ | ○ | X |

As may be seen from this Table 2, it is similarly desirable, in a polymer cell, to set the thickness of the layer of the cathode active material to not less than 25 μm and not larger than 110 μm on one side, with the sum on both sides being not less than 50 μm and to not larger than 220 μm.

Similar cells were prepared using, in place of $LiFePO_4$ carbon composite material, a $LiFe_{0.2}Mn_{0.8}PO_4$ carbon composite material, a $LiFe_{0.2}Cr_{0.8}PO_4$ carbon composite material, a $LiFe_{0.2}Co_{0.8}PO_4$ carbon composite material, a $LiFe_{0.2}Cu_{0.8}PO_4$ carbon composite material, a $LiFe_{0.2}Ni_{0.8}PO_4$ carbon composite material, a $LiFe_{0.25}V_{0.75}PO_4$ carbon composite material, a $LiFe_{0.25}Mo_{0.75}PO_4$ carbon composite material, a $LiFe_{0.25}Ti_{0.75}PO_4$ carbon composite material, a $LiFe_{0.3}Zn_{0.7}PO_4$ carbon composite material, a $LiFe_{0.3}Al_{0.7}PO_4$ carbon composite material, a $LiFe_{0.3}Ga_{0.7}PO_4$ carbon composite material, a $LiFe_{0.25}Mg_{0.75}PO_4$ carbon composite material, a $LiFe_{0.25}B_{0.75}PO_4$ carbon composite material and a $LiFe_{0.25}Nb_{0.75}PO_4$ carbon composite material, and conducted similar evaluation. It was found that, by setting the thickness of the layer of the cathode active material to not less than 25 μm and not larger than 110 μm on one side, with the sum of the film thicknesses on both sides being not less than 50 μm and not larger than 220 μm.

What is claimed is:

1. A non-aqueous electrolyte secondary cell comprising:
  a cathode having a layer of a cathode active material containing a compound represented by the general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$;
  an anode having a layer of an anode active material containing an anode active material; and
  a non-aqueous electrolyte;
  wherein,
    said layer of the cathode active material has a film thickness in a range from 25 to 110 μm, and said layer of the cathode active material is formed on each surface of the cathode current collector and wherein the sum of film thicknesses of the layers of the cathode active material formed on opposite surfaces of said cathode ranges between 50 and 220 μm.

2. The non-aqueous electrolyte secondary cell according to claim 1 wherein said anode active material is capable of doping/undoping lithium.

3. The non-aqueous electrolyte secondary cell according to claim 2 wherein said anode has a layer of the anode active material formed on each surface of an anode current collector.

4. The non-aqueous electrolyte secondary cell according to claim 1 wherein the non-aqueous electrolyte cell is a spiral coil comprised of the layer of the cathode active material and the layer of the anode active material wound a plural number of times with a separator in-between.

5. The non-aqueous electrolyte secondary cell according to claim 1 wherein the layer of the cathode active material is a $LiFePO_4$ carbon composite material.

6. The non-aqueous electrolyte secondary cell according to claim 5 wherein the carbon content per unit weight of said $LiFePO_4$ carbon composite material is not more than 3 wt %.

7. The non-aqueous electrolyte secondary cell according to claim 5 wherein the carbon material forming said $LiFePO_4$ carbon composite material exhibits a strength area ratio A(D/G) defined as being a background-free Raman spectral intensity area ratio A(D/G) of a G-peak appearing at the number of waves of 1570 to 1590 $cm^{-1}$ and a D-peak appearing at the number of waves of 1340 to 1360 $cm^{-1}$ as measured by the Raman spectroscopic method.

8. The non-aqueous electrolyte secondary cell according to claim 5 wherein the powder density of the $LiFePO_4$ carbon composite material is not less than 2.2 g/cm3.

9. The non-aqueous electrolyte secondary cell according to claim 5 wherein the Bullnauer Emmet teller specific surface area of said $LiFePO_4$ carbon composite material is not less than 10.3 $m^2$/g.

10. The non-aqueous electrolyte secondary cell according to claim 5 wherein the particles of said $LiFePO_4$ carbon composite material are not larger than 3.1 μm.

11. The non-aqueous electrolyte secondary cell according to claim 1 wherein said non-aqueous electrolyte is a non-aqueous electrolyte solution obtained by dissolving an electrolyte in a non-protonic non-aqueous solvent.

12. The non-aqueous electrolyte secondary cell according to claim 1 wherein said non-aqueous electrolyte is a solid electrolyte.

* * * * *